Aug. 26, 1958 W. A. TURUNEN ET AL 2,849,210
TURBINE BLADE COOLING SYSTEM
Filed Jan. 19, 1953 2 Sheets-Sheet 1

Inventors
William A. Turunen &
Patrick W. O'Connell, deceased
by Elaine A. O'Connell, Administratrix
By Willits, Helwig & Caillio
Attorneys

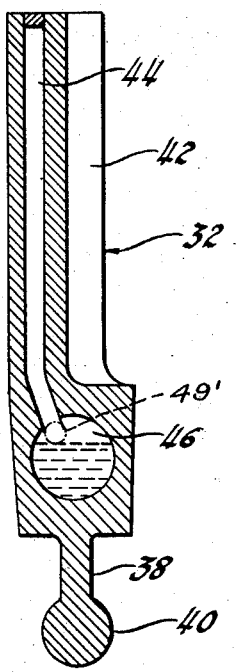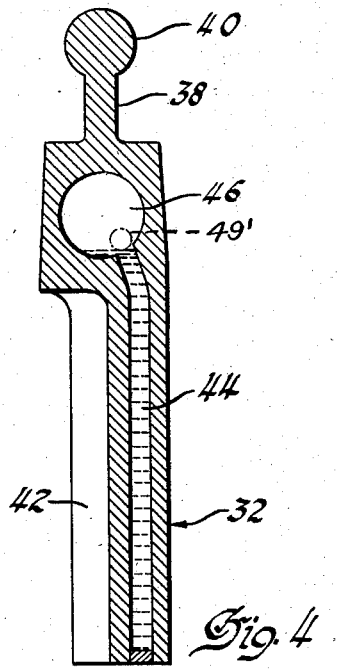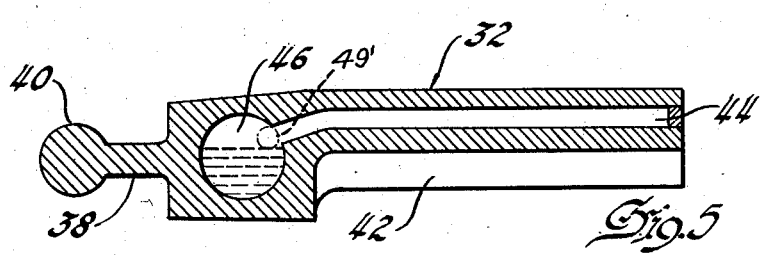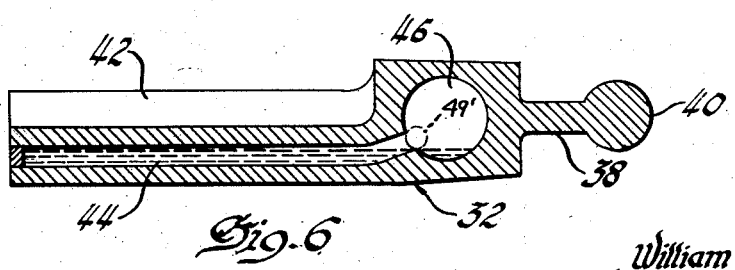

United States Patent Office 2,849,210
Patented Aug. 26, 1958

2,849,210

TURBINE BLADE COOLING SYSTEM

William A. Turunen, Birmingham, Mich., and Patrick W. O'Connell, deceased, late of Royal Oak, Mich., by Elaine A. O'Connell, administratrix, Royal Oak, Mich., assignors to General Motors Corporation, Detroit, Mich., a corporation of Delaware Application January 19, 1953, Serial No. 331,991

7 Claims. (Cl. 253—39.15)

This invention relates to fluid cooled turbines and more particularly to a vaporization cooling arrangement for the turbine buckets of a high temperature turbine.

An object of this invention is to provide the turbine buckets of a high temperature turbine with a sealed evaporative cooling system.

Another object of this invention is to provide a turbine wheel having mechanically fastened buckets with an evaporative cooling system that is rotatable with the turbine wheel.

Another object of this invention is to provide a turbine bucket for an evaporative cooled turbine wheel that will permit the use of coolants that may solidify at atmospheric temperatures without adversely affecting the starting balance of the turbine wheel.

A further object of this invention is to provide a turbine bucket for an evaporative cooled turbine wheel that will permit the use of coolants that may solidify at atmospheric temperatures without rupturing the turbine buckets.

Further objects and advantages of this invention will be apparent from the following description, reference being had to the accompanying drawings wherein a preferred form of the invention is clearly shown.

In the drawings—

Figs. 3 through 6 are sectional views that illustrate the disposition of the coolant in the turbine buckets at 90 degree intervals around the turbine wheel when the wheel is stationary.

Figures 1, 2:
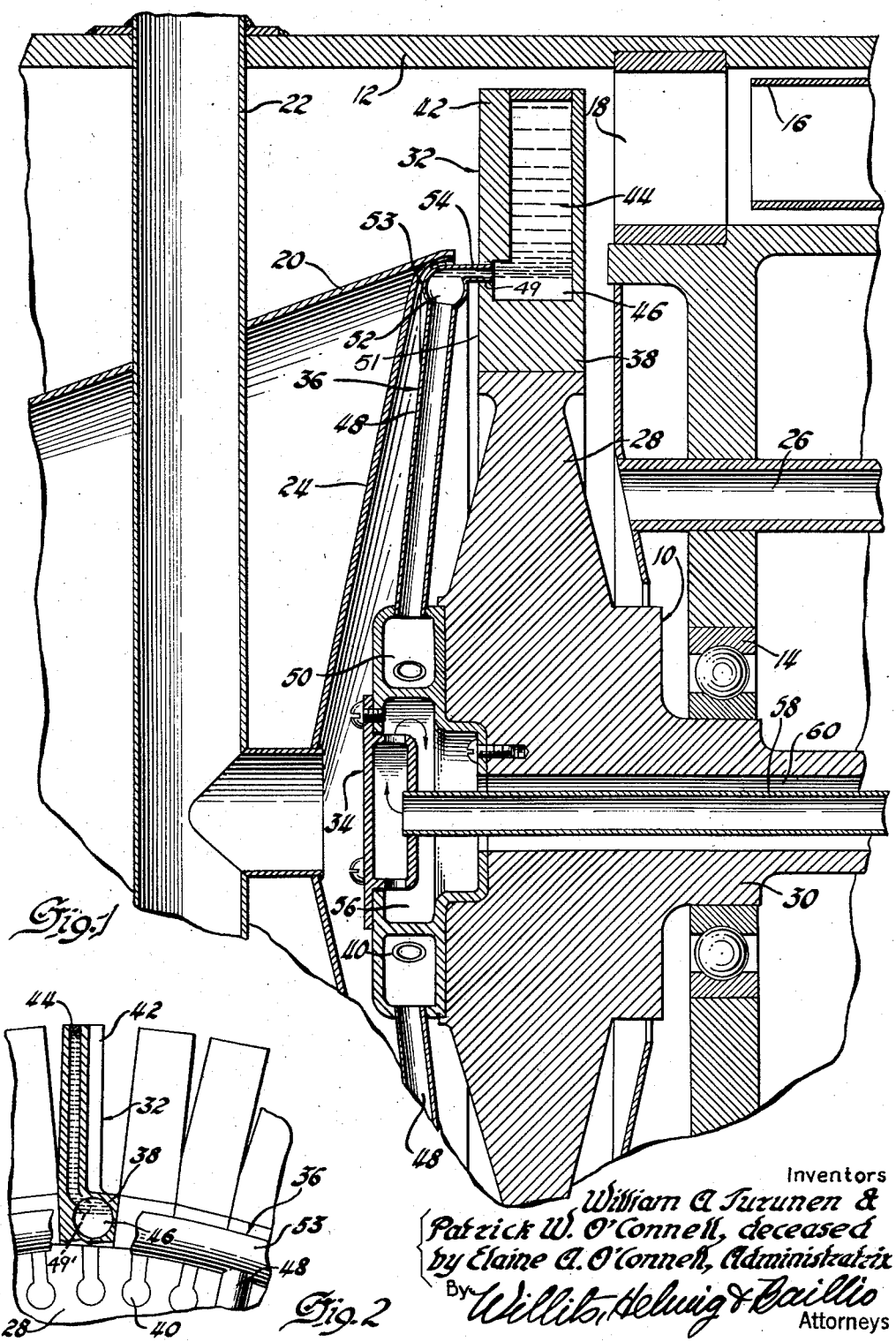
Fig. 1 is a partial sectional view taken through the axis of the turbine portion of a gas turbine engine incorporating the invention.
Fig. 2 is a partial elevation of the rear face of the turbine wheel of Fig. 1 having portions broken away to illustrate the interior of a turbine bucket.

Referring now to the drawings in detail and more particularly to Fig. 1, the coolant system is shown as incorporated in an axial flow turbine wheel of a gas turbine engine such as is commonly used for powering high-speed aircraft. Such engines generally include a compressor that discharges into a combustion chamber to which fuel is supplied so that the resulting heated gases may be utilized to drive a turbine wheel which in turn will drive the compressor. Only the turbine portion of such an engine is illustrated, as these engines are well known. It should be understood that the invention may be applied to many types of turbine engines although it is particularly advantageous when incorporated in an aircraft gas turbine.

The turbine rotor assembly 10 is supported for rotation in the annular casing 12 by the bearing 14. The casing 12 encloses and supports the combustion chamber outlet tubes 16 that feed the heated gases through the nozzle vane ring assembly 18 to drive the turbine. An inner tail cone 20 is supported within the casing 12 by the struts 22 to define an annular turbine exhaust path. Cooling air is introduced into the struts 22 from any suitable source; for example, from the compressor of the engine. A disk 24 is fitted in the divergent end of the cone 20 in axially spaced relation to the rear face of the turbine rotor assembly 10 so that the cooling air may be directed outwardly over the rear face. The cooling air is also led to the forward face of the turbine rotor assembly 10 by a conduit 26.

If desired, the supply of cooling air to the turbine rotor assembly 10 by the struts 22 and the conduit 26 may be eliminated as the primary means for cooling the turbine rotor is the evaporative coolant system yet to be described.

The turbine rotor assembly 10 comprises the turbine wheel disk 28 which has a shaft portion 30 that connects with the compressor, the turbine buckets 32, the condenser 34 and the ring manifold 36.

The turbine buckets 32 may have their root portions 38 secured to the turbine wheel disk 28 in any suitable fashion as, for example, by a conventional bulb dovetail as at 40 in Fig. 2. The bladed portions 42 of the turbine buckets 32 are formed with internal cavities or chambers 44 which connect with the chambers 46 in the root portions 38. The manifold 36 includes a series of radial coolant passages or tubes 48 which are connected at their inner ends to the annular condensing chamber 50 of the condenser 34 and at their outer ends to the annular vaporizing chamber 52 of the ring-like tube 53. The vaporizing chamber 52 is connected through access openings 49 in the side walls 51 of the bucket roots 38 to the radially outer portions of each of the root chambers 46 by a peripheral row of conduits or transfer tubes 54.

The broken line circle 49' in chamber 46 in Fig. 2 represents an imaginary extension of the access opening 49 to show the entrance location of the transfer tube 54 in a chamber 46. The chambers 44, the chambers 46, 50 and 52, and the interiors of the tubes 48 and 54 form an integral chamber in which is sealed a small amount of a suitable coolant and a gasous medium such as air. The coolant should be characterized by a high heat of vaporization and should boil at the desired turbine operating speed and temperature, that is, the vapor pressure of the coolant should be equal to the total pressure at the free surface of the coolant at the optimum speed and temperature of the turbine buckets. In some instances it is necessary to regulate the total pressure in the system to obtain the desired operating boiling point by sealing the coolant and the gaseous medium in the integral chamber at pressures above or below atmospheric.

The amount of coolant that is sealed in the integral chamber should be such that there will be some coolant in liquid state in the vaporizing or equalizing chamber 52 and the transfer tubes 54 during ordinary turbine operation as indicated in Figs. 1 and 2.

The coolant may be in liquid or solid state at atmospheric temperatures and an important feature of the invention is to protect the turbine buckets from bursting during a solidification of the coolant. Some of the coolants which are satisfactory are water, sodium, sulphur, potassium, mercury and fluorocarbons. Figs. 1 and 2 indicate the operating coolant level while Figs. 3 through 6 indicate the disposition of the coolant in various turbine buckets around the turbine wheel when the wheel is stationary.

The operation of the sealed cooling system is continuous and completely automatic. While the coolant in the sealed integral chamber may be a solid at atmospheric temperatures, it is quickly liquified during operation and the coolant in the buckets 32 and the vaporizing chamber 52 absorbs heat from the buckets to be continuously vaporized therein to thereby cool the buckets. Vaporized coolant is displaced inwardly into the condensing chamber 50 through the tubes 48 where condensation takes place to reliquify the coolant. The reliquified coolant is returned by centrifugal force to the vaporizing or equalizing chamber 52 and the buckets 32 to complete the cycle. The chamber 52 insures an equalized delivery of liquid coolant to the various turbine buckets and additionally provides a location where much vaporization occurs.

An important feature of the invention is the locating of the transfer tubes 54 and the coolant traps or chambers 46 in the buckets 32. The transfer tubes 54 enter the chambers 46 where the chambers connect with the passages 44. When turbine operation ceases and the turbine wheel stops, most of the coolant is thereby retained in the buckets and is contained either in the passages 44 and/or within the coolant traps or chambers 46 depending upon the peripheral position of a particular bucket as may be clearly seen in Figs. 3 through 6 which illustrate a stopped bucket in the 12, 6, 3 and 9 o'clock positions. By trapping most of the coolant equally in the buckets when the turbine is stopped, any starting out of balance of the turbine is minimized as the coolant is distributed around the entire periphery of the turbine wheel.

The volume of the coolant trap or chamber 46 in the root portion of a bucket is slightly greater than the volume of the coolant passage 44 in the bladed portion of the bucket. The chamber 46 thus provides space wherein the trapped coolant may expand. This is important under conditions where the coolant solidifies when the turbine is shut down for the expansion space allows the coolant to expand during a physical change in state and thus prevents bucket breakage. A test utilizing sulphur as a coolant without an expansion chamber 46 resulted in the rupture of several turbine buckets in turbine operation. It was deduced that the sulphur in the buckets and the transfer tubes solidified when the wheel stopped and that sulphur in the buckets melted before the sulphur in the transfer tubes when the wheel was started so that the internal pressure developed when the melted sulphur could not expand into the solid sulphur containing transfer tubes burst the buckets.

The condenser 34 is provided with an annular chamber 56 through which an external coolant is passed to absorb heat from the condensing chamber 50. The external coolant enters the conduit 58 through a suitable running seal (not shown) on the turbine shaft and after passing through the chamber 56 exhausts through the passage 60 in the turbine shaft. The external coolant may be the fuel or some of the compressed air which is fed to the combustion chambers to run the engine, in which instances at least part of the heat which is extracted from the turbine buckets will be returned to the gas turbine as usable energy. Other external coolants may, of course, be utilized and in some instances it may be desirable to utilize a sealed external coolant system that includes a suitable radiator.

While the preferred embodiment of the invention has been described fully in order to explain the principles of the invention, it is to be understood that modifications in structure may be made by the exercise of skill in the art within the scope of the invention, which is not to be regarded as limited by the detailed description of the preferred embodiment.

We claim:
1. An evaporative cooled turbine having a sealed coolant system comprising a rotatable turbine wheel, turbine buckets having root portions dovetailed to the rim of said turbine wheel, said buckets defining liquid coolant chambers in said buckets having access openings through the sides of said root portions, coolant distributing means on said turbine wheel comprising an annular inner coolant condensing chamber connected by radial coolant passages to an annular coolant vaporizing chamber, said vaporizing chamber being disposed radially outward of the condensing chamber and proximate radially with said root portions, and liquid coolant transfer tubes connecting said access openings with said vaporizing chamber.

2. An evaporative cooled turbine comprising a rotatable turbine wheel having radially disposed turbine buckets around its rim, each of said buckets defining an internal chamber terminating in radial and circumferential extremities, means for continuously supplying a coolant in liquid state to the chambers of said buckets during turbine operation to be vaporized therein and for continuously removing the coolant in vapor state therefrom including a conduit communicating with each of said chambers, the conduits terminating in said chambers intermediate the radial and circumferential extremities of said chambers whereby liquid state coolant is trapped in all of said chambers when the turbine is stopped irrespective of their peripheral position.

3. An evaporative cooled turbine comprising a rotatable turbine wheel having radially disposed turbine buckets having root and blade portions around its rim, each of said buckets defining a chamber terminating in radial extremities in said root and blade portions, means for continuously supplying a coolant in liquid state to said chambers of said buckets during turbine operation to be vaporized therein and for continuously removing the coolant in vapor state therefrom including conduits communicating with said chambers of said buckets, said conduits terminating in said chambers intermediate said radial extremities of said chambers whereby liquid state coolant is trapped in all of said buckets when the turbine is stopped irrespective of their peripheral position.

4. An evaporative cooled turbine comprising a rotatable turbine wheel having radially disposed turbine buckets around its rim, said buckets including root and blade portions defining interconnected internal root and blade chambers respectively, means for continuously supplying a coolant in liquid state to said chambers during turbine operation to be vaporized therein and for continuously removing the coolant in vapor state therefrom including conduits leading from the exteriors of said buckets to said root chambers, said root chambers being larger volumetrically than said blade chambers, and said conduits having their entrances into said chambers adjacent the point where said root and blade chambers connect so that liquid state coolant is trapped in all of said buckets when the turbine is stopped irrespective of their peripheral position.

5. An evaporative cooled turbine having a sealed coolant system comprising a rotatable turbine wheel having radially disposed turbine buckets around its rim, said buckets defining internal bucket chambers terminating in radial extremities, means rotatable with said wheel for continuously supplying a coolant in liquid state to said chambers during turbine operation to be vaporized therein and for continuously removing the coolant in vapor state therefrom comprising an annular inner condensing chamber, an annular outer equalizing chamber, radial tubes interconnecting said condensing and equalizing chambers, and transfer tubes connecting said equalizing chamber to said bucket chambers and having their entrances into said bucket chambers intermediate said extremities of said bucket chambers so that liquid state coolant is trapped in all of said bucket chambers when the turbine is stopped irrespective of their peripheral position.

6. A turbine bucket comprising a blade portion having an internal cavity, a root portion having a side wall and an internal chamber, said blade cavity connecting with said root chamber, and a conduit extending through said side wall of said root portion and terminating in said root chamber adjacent said connection of said blade cavity and root chamber.

7. A turbine bucket comprising a blade portion having an internal cavity, a root portion having a side wall and an internal chamber, said cavity connecting with said chamber and the volume of said cavity being slightly less than the volume of said chamber, and a conduit extending through said side wall of said root portion and terminating in said chamber adjacent said connection of said cavity and chamber.

References Cited in the file of this patent

UNITED STATES PATENTS

| | | |
|---|---|---|
| 2,339,779 | Holzwarth | Jan. 25, 1944 |
| 2,667,326 | Ledinegg | Jan. 26, 1954 |

FOREIGN PATENTS

| | | |
|---|---|---|
| 478,970 | France | Nov. 2, 1915 |
| 623,841 | Great Britain | May 24, 1949 |